(12) United States Patent
Weyrauch et al.

(10) Patent No.: US 12,441,408 B2
(45) Date of Patent: Oct. 14, 2025

(54) VEHICLE ROOF STRUCTURE

(71) Applicant: Ford Global Technologies, LLC, Dearborn, MI (US)

(72) Inventors: Adam Weyrauch, Canton, MI (US); Steven Frank, Dearborn, MI (US); Jack Lashbrook, Garden City, MI (US); Rohit Telukunta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 17/880,610

(22) Filed: Aug. 3, 2022

(65) Prior Publication Data

US 2024/0043068 A1     Feb. 8, 2024

(51) Int. Cl.
    B62D 25/06      (2006.01)
(52) U.S. Cl.
    CPC .................................... B62D 25/06 (2013.01)
(58) Field of Classification Search
    CPC ..................................................... B62D 25/06
    USPC ......................... 296/210, 215, 216.01, 203.01
    See application file for complete search history.

(56) References Cited

U.S. PATENT DOCUMENTS

| | | | | |
|---|---|---|---|---|
| 2,122,444 A * | 7/1938 | Tjaarda | ................. | B62D 23/00 296/203.01 |
| 2,987,345 A * | 6/1961 | Grisinger | ............... | B62D 25/06 296/213 |
| 3,635,519 A * | 1/1972 | Foster | ................... | B62D 25/06 296/210 |
| 6,582,013 B1 | 6/2003 | Inoue et al. | | |
| 7,556,116 B2 * | 7/2009 | Ootani | ............... | B60R 21/0136 180/274 |
| 7,604,286 B2 * | 10/2009 | Watanabe | ............. | B62D 25/06 296/210 |
| 8,100,466 B2 | 1/2012 | Leroy et al. | | |
| 8,888,165 B2 * | 11/2014 | Roush | ........................ | B60J 7/10 296/210 |
| 9,708,009 B2 * | 7/2017 | Vance | .................... | B62D 25/06 |
| 10,029,736 B1 * | 7/2018 | Arora | ..................... | B62D 25/06 |
| 10,065,694 B1 * | 9/2018 | Rompage | ............... | B62D 25/06 |
| 10,569,721 B2 * | 2/2020 | Frederick | ............. | G05D 1/0231 |

(Continued)

FOREIGN PATENT DOCUMENTS

| | | | | |
|---|---|---|---|---|
| CA | 3049164 A1 * | 9/2018 | ....... | B32B 17/10036 |
| EP | 1690780 A3 * | 9/2009 | ............ | B62D 25/06 |
| FR | 3055880 A1 * | 3/2018 | ............ | B62D 25/06 |

OTHER PUBLICATIONS

DE 102005006201 A1 with English Translation (Year: 2006).*

*Primary Examiner* — Lori Lyjak
(74) *Attorney, Agent, or Firm* — Burris Law, PLLC (57) ABSTRACT

A vehicle roof structure of a vehicle includes an outer roof panel and a unitized inner roof panel. The inner roof panel is separate from the outer roof panel and is secured to the outer roof panel. The inner roof panel includes roof headers, a roof bow, and support braces. The roof headers are spaced apart from each other and extend in a transverse direction relative to a longitudinal direction of the vehicle. The roof bow is spaced apart from and positioned between two roof headers of the roof headers and extends in the transverse direction. Each support brace is positioned between the roof bow and one of the two roof headers. The support braces extend from the roof bow to the one of the two roof headers and extend in multiple directions.

17 Claims, 8 Drawing Sheets

(56) References Cited

U.S. PATENT DOCUMENTS

| | | | |
|---|---|---|---|
| 11,192,592 B2* | 12/2021 | Zenitani | B62D 25/06 |
| 11,619,254 B2* | 4/2023 | Michaels | F16B 37/061 |
| | | | 296/210 |
| 2006/0061145 A1 | 3/2006 | Strebe et al. | |
| 2018/0037268 A1* | 2/2018 | Moore | G01S 7/4813 |
| 2019/0210546 A1 | 7/2019 | Slovesko | |

* cited by examiner

VEHICLE ROOF STRUCTURE

FIELD

The present disclosure relates to a roof structure for a vehicle and a vehicle including a roof structure.

BACKGROUND

The statements in this section merely provide background information related to the present disclosure and may not constitute prior art.

Vehicles include roof structures typically formed of a plurality of parts (e.g., roof bows, headers, panels). If there are different types of roof structures (e.g., one with a sunroof and one without a sunroof), the generally assembly of the vehicle can create layers of complexity to accommodate for the different roof structures. In addition, roof structures may require electrical connectivity and/or the desire to support external structures mounted on the roof structure, which adds to the complexity of manufacturing and assembling the roof structure. The present disclosure addresses potential challenges regarding conventional roof structures.

SUMMARY

This section provides a general summary of the disclosure and is not a comprehensive disclosure of its full scope or all of its features.

In one form, the present disclosure provides a vehicle roof structure of a vehicle that includes an outer roof panel and a unitized inner roof panel. The inner roof panel is separate from the outer roof panel and is secured to the outer roof panel. The inner roof panel includes roof headers, a roof bow, and support braces. The roof headers are spaced apart from each other and extend in a transverse direction relative to a longitudinal direction of the vehicle. The roof bow is spaced apart from and positioned between two roof headers of the roof headers and extends in the transverse direction. Each support brace is positioned between the roof bow and one of the two roof headers. The support braces extend from the roof bow to the one of the two roof headers and extend in multiple directions.

In variations of the vehicle roof structure of the above paragraph, which may be implemented individually or in any combination: the unitized inner roof panel has a thickness that is greater than a thickness of the outer roof panel; the outer roof panel is mechanically interlocked with the unitized inner roof panel; the outer roof panel includes sides that are folded over respective sides of the unitized inner roof panel to mechanically interlock the outer roof panel and the unitized inner roof panel; a pair of roof rails are disposed at opposing sides of the outer roof panel, the outer roof panel is fixed to the pair of roof rails; reinforcement members are secured to an upper surface of the unitized inner roof panel and are positioned between the outer roof panel and the unitized inner roof panel; at least one reinforcement member of the reinforcement members has a variable thickness; the support braces are positioned above the roof headers and the roof bow; an adhesive material is between the outer roof panel and the unitized inner roof panel and bonded to the outer roof panel and the unitized inner roof panel; two support braces of the support braces form an X shape; the roof headers include a front roof header and a rear roof header, the support braces include a first set of support braces positioned between the roof bow and the front roof header and a second set of support braces positioned between the roof bow and the rear roof header; and the first and second sets of the support braces are positioned above the front roof header, the rear roof header and the roof bow.

In another form, the present disclosure provides a vehicle roof structure of a vehicle that includes an outer roof panel and a unitized inner roof panel. The inner roof panel is separate from the outer roof panel and mechanically interlocked to the outer roof panel. The inner roof panel includes roof headers, a roof bow, and support braces. The roof headers include a front roof header and a rear roof header spaced apart from each other and extending in a transverse direction relative to a longitudinal direction of the vehicle. The roof bow is spaced apart from and positioned between the front and rear roof headers and extends in the transverse direction. Each support brace is positioned above the roof bow and the front and rear roof headers. The support braces include a first set of support braces positioned between the roof bow and the front roof header and a second set of support braces positioned between the roof bow and the rear roof header.

In yet another form, the present disclosure provides a vehicle including a pair of roof rails and a roof structure disposed between the pair of roof rails. The roof structure includes an outer roof panel fixed to the pair of roof rails and a unitized inner roof panel separate from the outer roof panel and mechanically interlocked to the outer roof panel. The unitized inner roof panel includes roof headers, a roof bow, and support braces. The roof headers are spaced apart from each other and extend in a transverse direction relative to a longitudinal direction of the vehicle. The roof bow is spaced apart from and positioned between two roof headers of roof headers and extends in the transverse direction. The support braces are positioned between the roof bow and one of the roof headers. The support braces extend from the roof bow to the one of the roof headers In variations of the vehicle of the above paragraph, a sensor structure is mounted to the outer roof panel and supported by the support braces.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-4, a vehicle 10 (FIG. 1) is illustrated having a vehicle body 14. In some forms, the vehicle 10 can be an electric vehicle such as a battery electric vehicle (BEV). In other examples, the vehicle 10 may be a hybrid electric vehicle (HEV), a plug-in electric vehicle (PHEV), or a fuel cell vehicle, among others. If the vehicle 10 is an electric vehicle, the vehicle 10 includes a battery pack (not shown). The battery pack may be rechargeable and may include lithium-ion batteries or any other suitable electrical power storage units. The battery pack may be disposed at various locations of the vehicle 10 and may be mounted to the vehicle body 14. In this way, the battery pack is supported by the vehicle body 14 and is remote from a passenger cabin (not shown) and cargo compartments (not shown) of the vehicle 10, therefore, not occupying space that would otherwise be available for passengers or cargo. The battery pack powers one or more motors to drive a set of drive wheels. For example, the battery pack may power a rear motor (not shown) to drive a set of rear wheels (not shown) via a rear axle (not shown) and/or may power a front motor (not shown) to drive a set of front wheels (not shown) via a front axle (not shown). In some forms, the vehicle 10 may be powered by an internal combustion engine instead of a battery pack.

Figure 1:
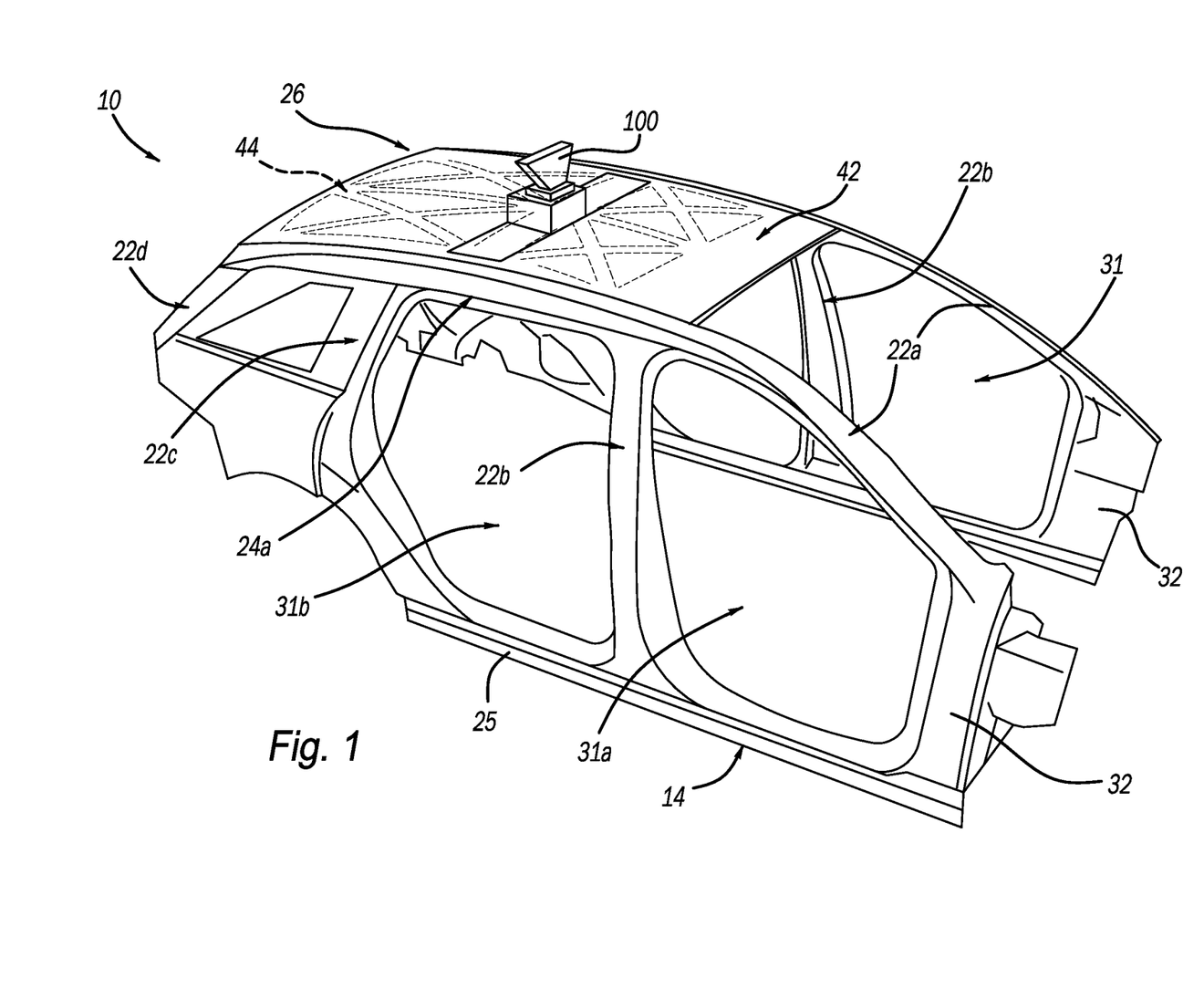
FIG. 1 is a perspective view of a vehicle body including roof structure according to the principles of the present disclosure.

In the example illustrated, the vehicle body 14 includes a plurality of pillars (e.g., A-pillars 22a, B-pillars 22b, C-pillars 22c, D-pillars 22d), a pair of roof side rail assemblies 24a, 24b, and a roof structure 26. The A-pillars 22a, the B-pillars 22b, the rockers 25 and the roof side rail assemblies 24a, 24b cooperate to define front door openings 31a in the vehicle body 14. The B-pillars 22b, C-pillars 22c, the rockers 25, and the roof side rail assemblies 24a, 24b cooperate to define rear door openings 31b in the vehicle body 14. Doors (not shown) are rotatably coupled to hinge pillars 32 or the B-pillars 22b to be rotated between a closed position in which the doors are disposed within the door openings 31a or 31b and an open position in which the doors are removed from the door openings 31a or 31b. The vehicle body 14 can be a unibody vehicle architecture, though other configurations can be used, such as a body on frame vehicle architecture for example.

Each A-pillar 22a extends from a front end of a respective roof side rail assembly 24a, 24b to a respective hinge pillar 32 and includes an inner shell or member and an outer shell or member that are secured to each other to define an internal cavity (not shown) including, inter alia, one or more reinforcement plates (not shown). Each B-pillar 22b extends downward from a respective roof side rail assembly 24a, 24b to a respective rocker 25. Each B-pillar 22b may extend from or near a middle portion of the respective roof side rail assembly 24a, 24b to or near a middle portion of the respective rocker 25. Each B-pillar 22b may include an inner shell and an outer shell that are secured to each other to define an internal cavity (not shown) including, inter alia, one or more reinforcement plates (not shown).

Figure 2:
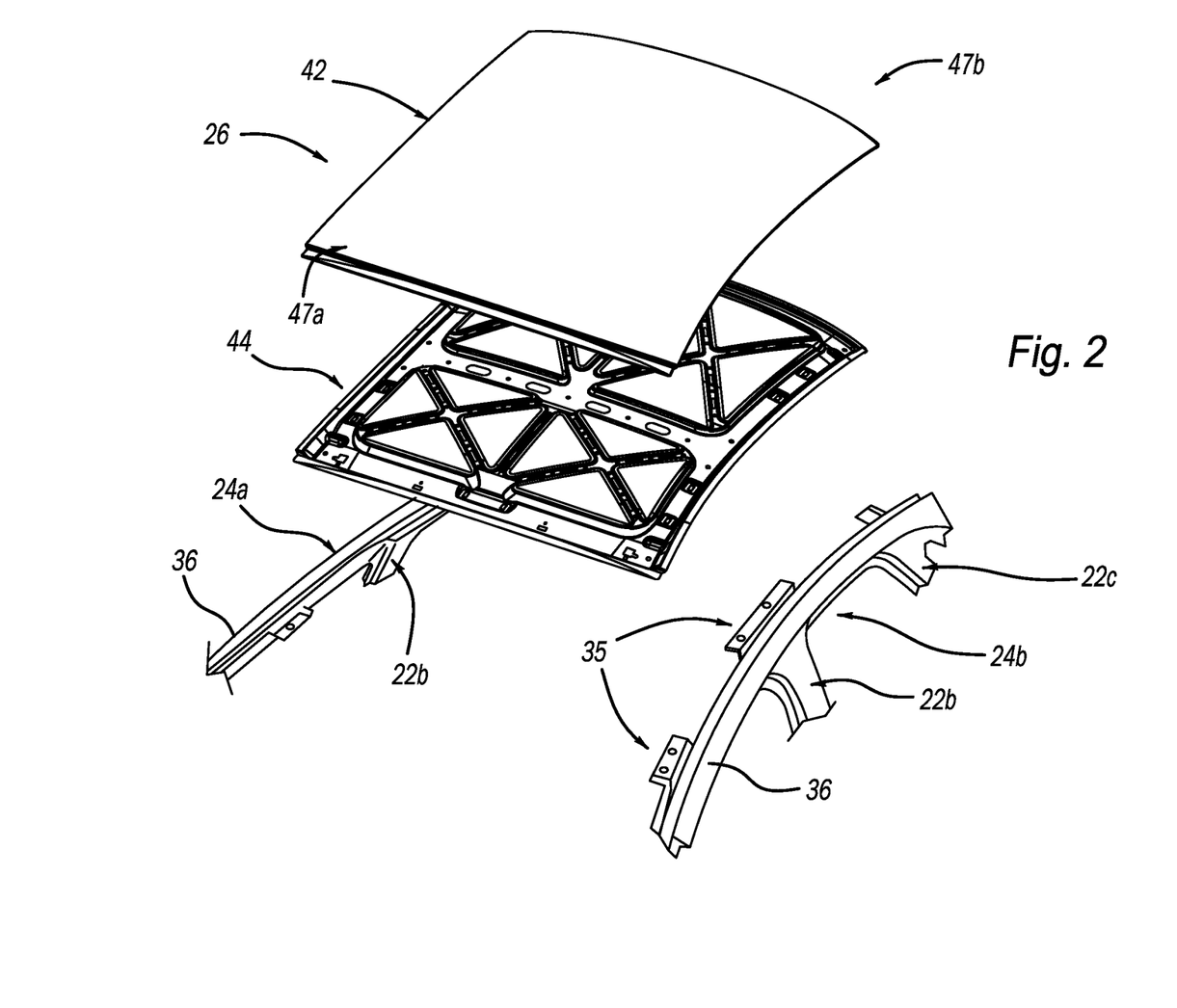
FIG. 2 is an exploded perspective view of the roof structure of the vehicle body of FIG. 1.
Figure 6:
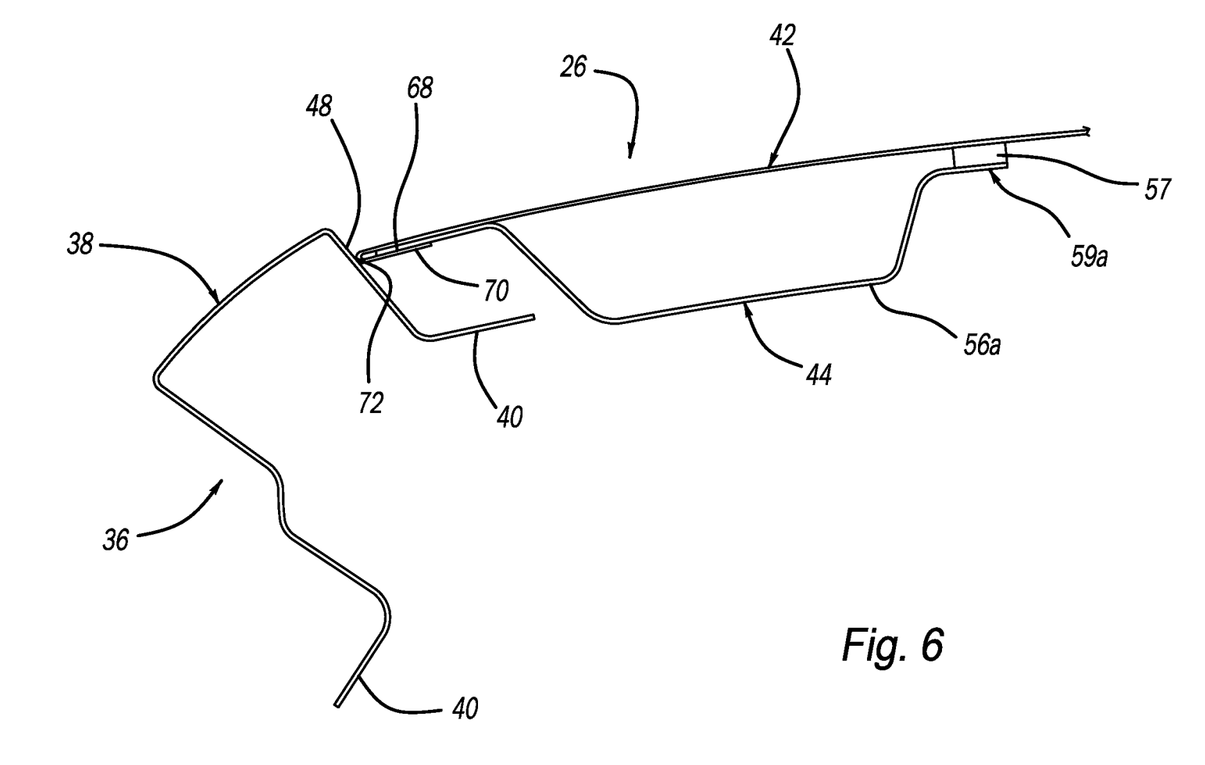
FIG. 6 is a cross-sectional view of the roof structure of FIG. 1.
Figure 7A:
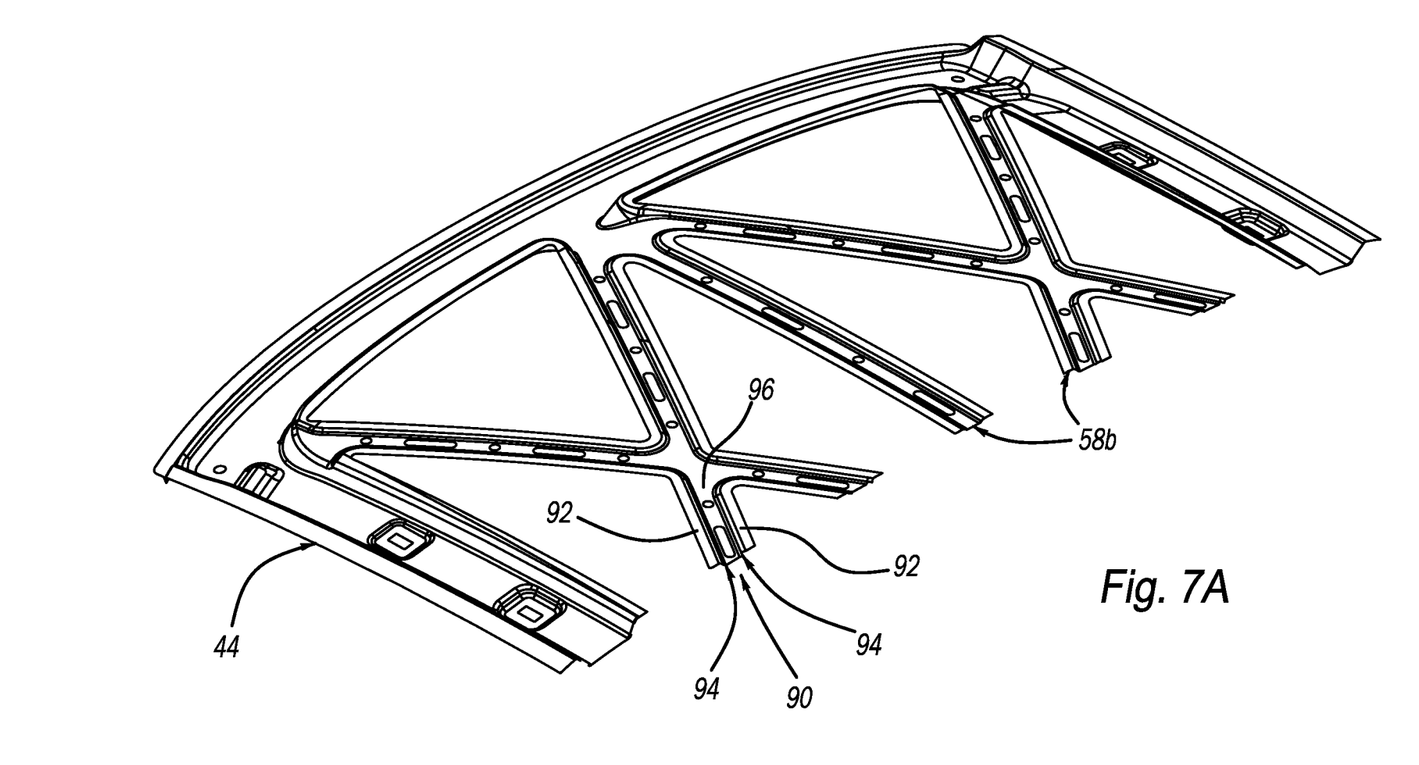
FIG. 7A is a cross-sectional view of the inner roof panel taken along line 7A-7A of FIG. 3.
Figure 7B:
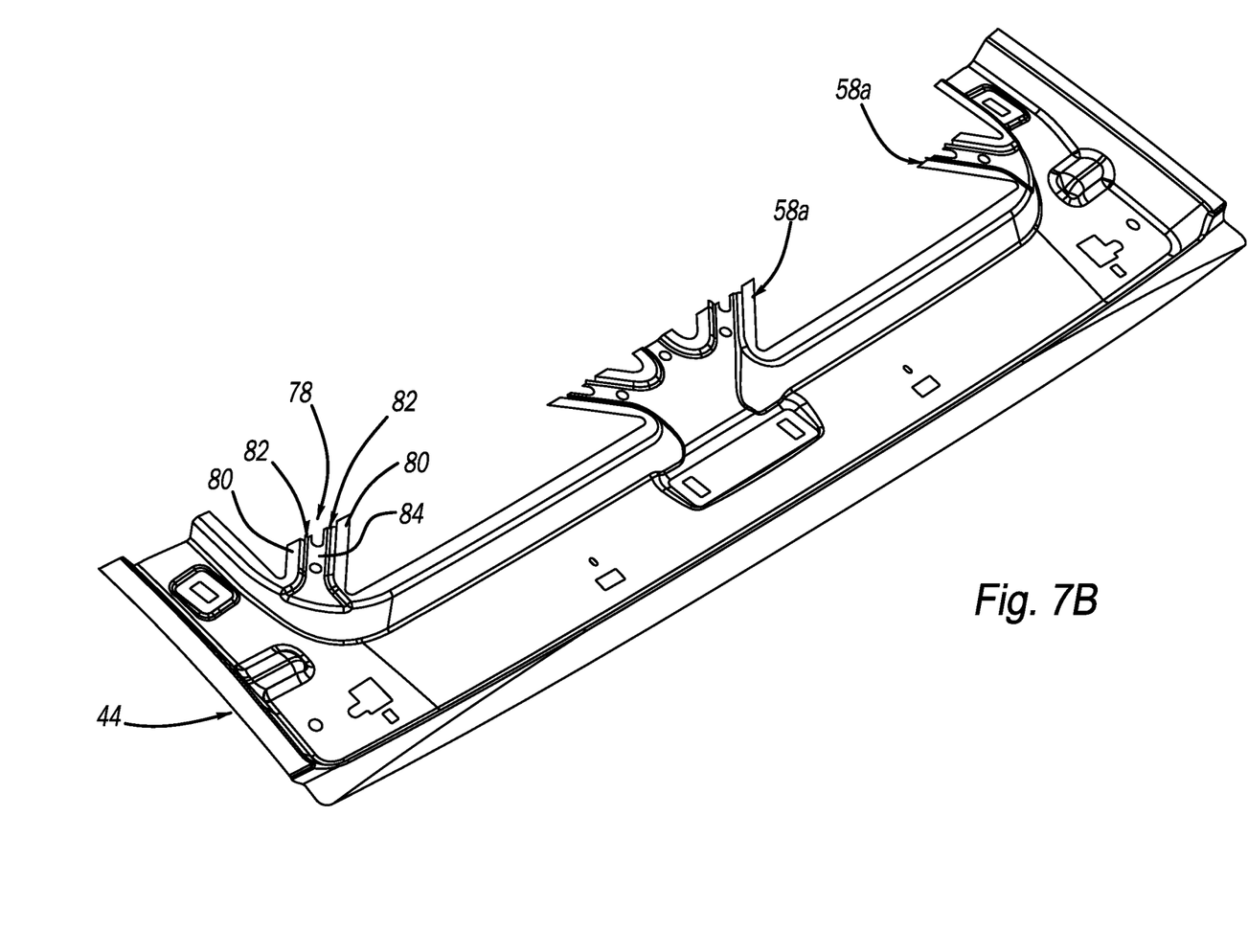
FIG. 7B is a cross-sectional view of the inner roof panel taken along line 7B-7B of FIG. 3.

The pair of roof side rail assemblies 24a, 24b are positioned at opposing sides of the vehicle 10 and extend along a longitudinal direction of the vehicle 10. Each of the roof rail assemblies 24a, 24b include an outer body member 36. With reference to FIGS. 2 and 6, the outer body member 36 is secured to the roof structure 26. In some forms, the outer body member 36 may also be secured to other structural rails of the roof side rail assemblies 24a, 24b. Each outer body member 36 extends in the longitudinal direction of the vehicle 10. In one form, each outer body member 36 and one or more pillar shells (e.g., B-pillar 22b, C-pillar 22c and D-pillar 22d) form a component. In other forms, each outer body member 36 and one or more pillar shells are separate components that are secured to each other via mechanical fasteners, welding, adhesives or any other suitable attachment means. Each outer body member 36 includes a U-shaped body 38 and a pair of flanges 40 extending generally perpendicularly from the body 38. In some forms, a plurality of L-shaped brackets 35 are secured to the vehicle roof structure 26 and a respective outer body member 36 and are configured to at least partially support of the vehicle roof structure 26. Each outer body member 36 may optionally include one or more class A surfaces.

The vehicle roof structure 26 is disposed between the pair of roof rail assemblies 24a, 24b and includes an outer roof panel 42 and a unitized roof inner panel 44 that is separate from the outer roof panel 42. In one form, the outer roof panel 42 is manufactured by a stamping process. The outer roof panel 42 has an arcuate shape from a front end 47a toward a rear end 47b. The outer roof panel 42 is located outboard relative to the inner roof inner panel 44 and is fixed to the outer body members 36 of the pair of roof rail assemblies 24a, 24b. That is, the outer roof panel 42 is fixed to inboard sides 48 of the bodies 38 (only one shown in FIG. 6) of the outer body members 36 such that the outer body members 36 of the pair of roof rail assemblies 24a, 24b extend outwardly further than the outer roof panel 42.

With reference to FIGS. 2-7B, the roof inner panel 44 may be manufactured by a stamping process and has an arcuate shape from a front end 49a toward a rear end 49b. The roof inner panel 44 includes a thickness that is greater than a thickness of the outer roof panel 42. Stated differently, the material thickness (i.e., gauge thickness) of the roof inner panel 44 is greater than the material thickness (i.e., gauge thickness) of the outer roof panel 42. As such, the overall thickness of the roof inner panel 44 is also greater than the material thickness of the outer roof panel 42.

The roof inner panel 44 also includes a front roof header 50, a rear roof header 52, one or more roof bows 54, side braces 56a, 56b and a plurality of support braces 58a, 58b. The front roof header 50 is located at a front of the vehicle 10 (e.g., near the A-pillars 22a) and extends in a transverse direction relative to the longitudinal direction of the vehicle 10. The rear roof header 52 is spaced apart from the front roof header 50 and is located at a rear of the vehicle 10 (e.g., near the C-pillar 22c or D-pillar 22d). The rear roof header 52 also extends in the transverse direction. Each roof bow 54 is spaced apart from and positioned between the front and rear roof headers 50, 52 and extends in the transverse direction. Each side brace 56a, 56b is positioned on a respective side of the front roof header 50, the rear roof header 52, and the roof bow 54 and extends in a longitudinal direction of the vehicle 10. Each side brace 56a, 56b connects the front roof header 50, the rear roof header 52, and the roof bow 54 to each other.

The front roof header 50, the rear roof header 52, the roof bow 54, and the side braces 56a, 56b define one or more opening formed therein. In the example illustrated, the roof bow 54 includes first openings 61*a* (e.g., oblong shaped openings) and second openings 61*b* (e.g., circular shaped openings) arranged in an alternating arrangement along a length of the roof bow 54. In another example, one or more of the front roof header 50, the rear roof header 52 and the side braces 56*a*, 56*b* include openings 61*c* (e.g., rectangular-shaped openings and/or circular-shaped openings) along a length thereof. The front roof header 50, the roof bow 54 and a front portion of the side braces 56*a*, 56*b* form a first opening 62*a* in the roof inner panel 44. Similarly, the rear roof header 52, the roof bow 54, and a rear portion of the side braces 56*a*, 56*b* form a second opening 62*b* in the roof inner panel 44. In the example illustrated, the area of the second opening 62*b* is greater than the area of the first opening 62*a*. In some forms, the area of the first opening 62*a* may be equal to or greater than the area of the second opening 62*b*. The roof bow 54 acts as a partition between the first and second openings 62*a*, 62*b*. A support brace rim 59*a* extends upwardly from and around an inner periphery defining the first opening 62*a* and a support brace rim 59*b* extends upwardly from and around an inner periphery defining the second opening 62*b*. Adhesive material 57 (FIG. 6) such as adhesive strips may be positioned between the outer roof panel 42 and the roof inner panel 44 and is bonded to an inner surface of the outer roof panel 42 and an upper surface of a respective support brace rim 59*a*, 59*b*. In this way, the outer roof panel 42 is inhibited from deflecting outward relative to the roof inner panel 44 at or near a central location of the outer roof panel 42. Alternatively, or additionally, the adhesive material 57 may also be bonded to the inner surface of the outer roof panel 42 and an upper surface of a respective support brace 58*a*, 58*b*.

In the example illustrated, a panel connecting rim 60 extends upwardly from a periphery of the front roof header 50, the rear roof header 52 and the side braces 56*a*, 56*b*. A flange 68 extends perpendicular from and around a periphery of the panel connecting rim 60. In this way, as shown in FIG. 6, edges 70 of the outer roof panel 42 are folded over the flange 68, thereby mechanically interlocking the outer roof panel 42 and the roof inner panel 44 to each other. A portion of the outer roof panel 42 that includes a bend 72 contacts the inboard sides 48 of the bodies 38 of the outer body members 36. In this way, the outer roof panel 42 may be fixed (e.g., welded) to the outer body members 36.

Figure 3:
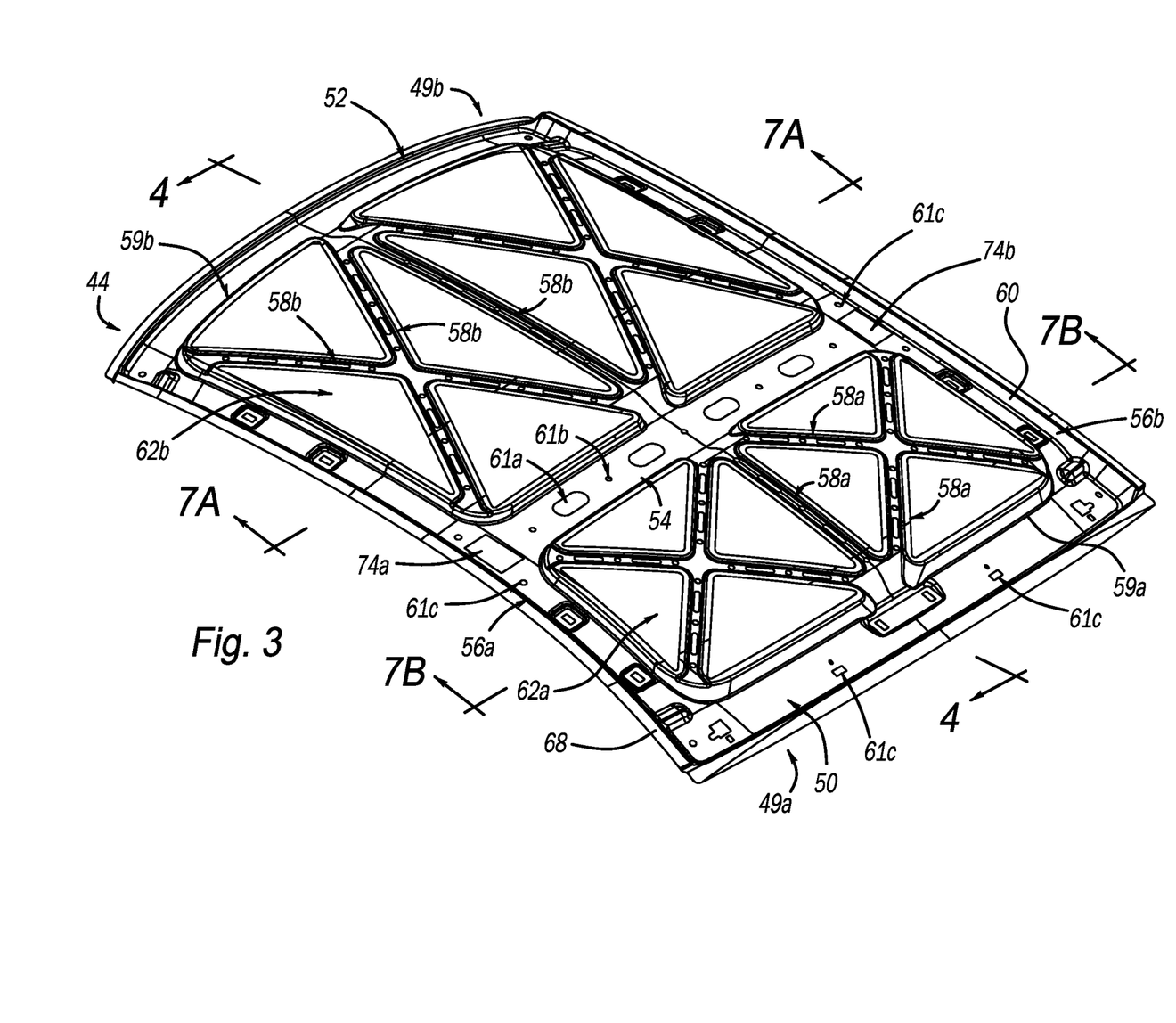
FIG. 3 is a perspective view of an inner roof panel of the roof structure of FIG. 1.
Figure 4:
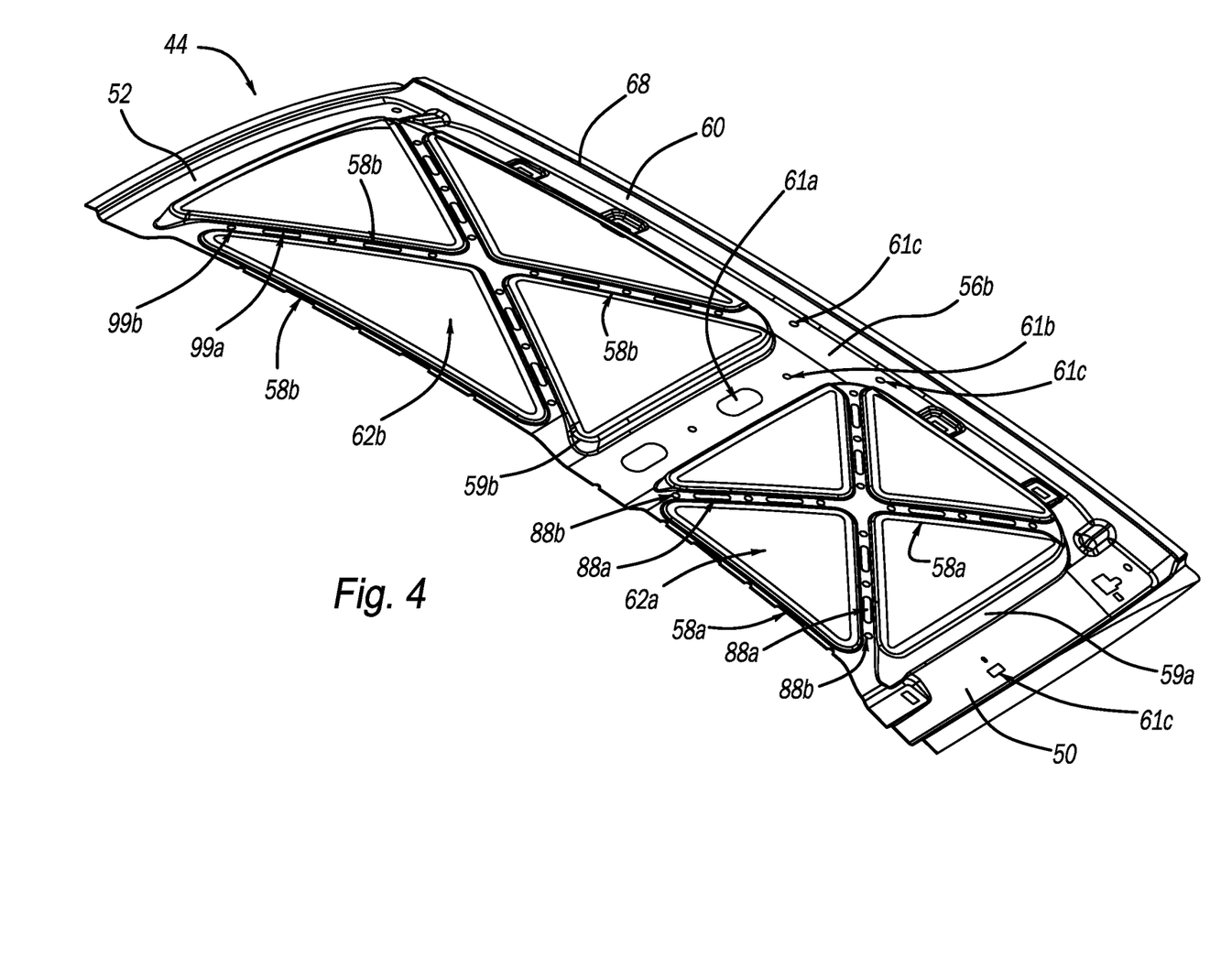
FIG. 4 is a perspective cross-sectional view of the inner roof panel taken along line 4-4 of FIG. 3.
Figure 5:
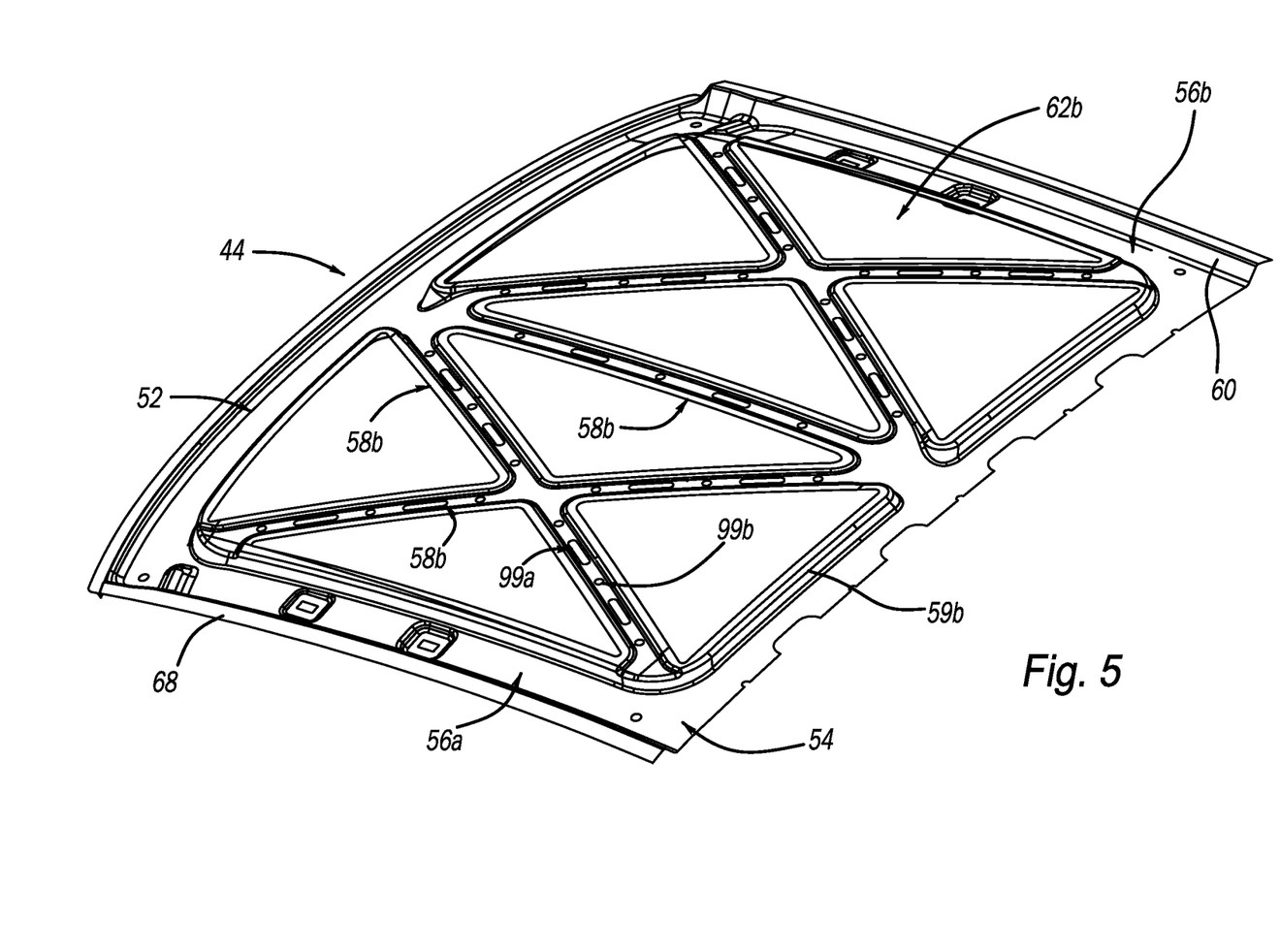
FIG. 5 is a perspective cross-sectional view of the inner roof panel of the roof structure of FIG. 1.

With reference to FIG. 3, reinforcement members 74*a*, 74*b* are fixed (i.e., welded) to one or more of the roof headers 50, 52, the roof bow 54 and the side braces 56*a*, 56*b* at predetermined locations. In this way, the roof structure 26 may be further reinforced at predetermined locations. In the example illustrated, reinforcement member 74*a* is fixed to an upper surface of the side brace 56*a* between the outer roof panel 42 and the roof inner panel 44, and reinforcement member 74*b* is fixed to an upper surface of the side brace 56*b* between the outer roof panel 42 and the roof inner panel 44. At least one of the reinforcement members 74*a*, 74*b* may have a variable thickness based in part on the structural requirements of the roof structure 26 and/or external structures disposed on and supported by the roof structure 26.

With reference to FIGS. 2-7B, each support brace 58*a* extends in multiple directions from the roof bow 54 to the front roof header 50 and may be configured to support external structures disposed on the roof structure 26. Each support brace 58*a* is also positioned above the roof bow 54 and the front and rear roof headers 50, 52. That is, each support brace 58*a* extends from a first portion of the support brace rim 59*a* located at the roof bow 54 to a second portion of the support brace rim 59*a* located at the front roof header 50. The first and second portions of the support brace rim 59*a* may extend in a transverse direction relative to the longitudinal direction of the vehicle 10 and/or may be a corner bend where the transverse extending portion of the support brace rim 59*a* intersects with a longitudinal extending portion the support brace rim 59*a*.

In the example illustrated, one or more support braces 58*a* extend parallel to the longitudinal direction of the vehicle 10, one or more support braces 58*a* extend in a first oblique direction relative to the longitudinal direction of the vehicle 10 (i.e., extend forwardly and laterally from the side brace 56*a* toward the side brace 56*b*), and one or more support braces 58*a* extend in a second oblique direction that is opposite the first oblique direction (i.e., extend forwardly and laterally from the side brace 56*b* toward the side brace 56*a*). One of the support braces 58*a* extending in the first oblique directions and one of the support braces 58*a* extending in the second oblique direction may be joined together at or near a central location of the support braces 58*a*, thereby forming a pair of support braces 58*a* having an X-shape. At least one support brace 58*a* extending parallel to the longitudinal direction of the vehicle 10 may be positioned between two pairs of supports braces 58*a* forming the X-shape. It should be understood that the support braces 58*a* may extend from the roof bow 54 to the front roof header 50 in multiple variations or patterns based in part on external structures disposed on and supported by the roof structure 26. For example, in some forms, all of the support braces 58*a* may extend parallel to the longitudinal direction of the vehicle 10 at a central location of the first opening 62*a* or may extend parallel to the longitudinal direction of the vehicle 10 at opposing sides of the first opening 62*a*. The support braces 58*a* may extend in a transverse direction and include a honeycomb shape.

Each support brace 58*a* includes a body 78 and a pair of flanges 80 extending from an end of the body 78. The body 78 has a U-shape and includes side walls 82 and an interconnecting wall 84 that connects the side walls 82. The flanges 80 extend from ends of the side walls 82. The interconnecting wall 84 is positioned below the flanges 80 and above the roof headers 50, 52 and the roof bow 54. The interconnecting wall 84 also cooperates with the side walls 82 to define a channel. In the example illustrated, the interconnecting wall 84 includes first openings 88*a* (e.g., oblong shaped openings) and second openings 88*b* (e.g., circular shaped openings) arranged in an alternating arrangement along at least a portion of the length of the interconnecting wall 84.

Each support brace 58*b* extends in multiple directions from the rear roof header 52 to the roof bow 54 and may be configured to support external structures disposed on the roof structure 26. Each support brace 58*b* is also positioned above the roof bow 54 and the front and rear roof headers 50, 52. That is, each support brace 58*b* extends from a first portion of the support brace rim 59*b* located at the rear roof header 52 to a second portion of the support brace rim 59*b* located at the roof bow 54. The first and second portions of the support brace rim 59*b* may extend in a transverse direction relative to the longitudinal direction of the vehicle 10 and/or may be a corner bend where the transverse extending portion of the support brace rim 59*b* intersects with a longitudinal extending portion the support brace rim 59*b*.

In the example illustrated, one or more support braces 58*b* extend parallel to the longitudinal direction of the vehicle 10, one or more support braces 58*b* extend in a first oblique direction relative to the longitudinal direction of the vehicle 10 (i.e., extend forwardly and laterally from the side brace 56a toward the side brace 56b), and one or more support braces 58b extend in a second oblique direction that is opposite the first oblique direction (i.e., extend forwardly and laterally from the side brace 56b toward the side brace 56a). One of the support braces 58b extending in the first oblique directions and one of the support braces 58b extending in the second oblique direction may be joined together at or near a central location of the support braces 58b, thereby forming a pair of support braces 58b having an X-shape. At least one support brace 58b extending parallel to the longitudinal direction of the vehicle 10 may be positioned between two pairs of supports braces 58b forming the X-shape. It should be understood that the support braces 58b may extend from the rear roof header 52 to the roof bow 54 in multiple variations or patterns based in part on external structures disposed on and supported by the roof structure 26. For example, in some forms, all of the support braces 58b may extend parallel to the longitudinal direction of the vehicle 10 at a central location of the opening 62b or may extend parallel to the longitudinal direction of the vehicle 10 at opposing sides of the opening 62b. In another example. The support braces 58b may extend in a transverse direction and include a honeycomb shape.

Each support brace 58b includes a body 90 and a pair of flanges 92 extending from an end of the body 90. The body 90 has a U-shape and includes side walls 94 and an interconnecting wall 96 that connects the side walls 94. The flanges 92 extend from ends of the side walls 94. The interconnecting wall 96 is positioned below the flanges 92 and above the roof headers 50, 52 and the roof bow 54. The interconnecting wall 96 also cooperates with the side walls 94 to define a channel. In the example illustrated, the interconnecting wall 96 includes first openings 99a (e.g., oblong shaped openings) and second openings 99b (e.g., circular shaped openings) arranged in an alternating arrangement along at least a portion of the length of the interconnecting wall 96.

One or more sensor structures 100 may be mechanically fastened to the outer panel 42 of the roof structure 26 via fasteners. In another example, the sensor structures 100 may be secured to the outer panel 42 of the roof structure 26 via welding. The sensor structures 100 are supported at least in part by the support braces 58a, 58b of the roof inner panel 44. The sensor structures 100 may include long range radar units, short range radar units, and/or cameras, for example.

The roof structure 26 of the present disclosure provides reduce parts compared to traditional vehicle roofs by consolidating parts into a roof outer panel 42 and a roof inner panel 44. The roof structure 26 of the present disclosure also provides support braces 58a, 58b integrated into the stamping of the roof inner panel 44, which adds structural rigidity to the roof structure 26. In this way, the vehicle 10 can support external structures mounted on the roof structure 26 such as sensors structures used in autonomous vehicles. The roof structure 26 also provides the roof outer panel 42 and the roof inner panel 44 to be mechanically interlocked to each other, which allows the roof outer panel 42 to be down gauged and allows reinforcement members to be added to the roof inner panel 44 for additional strength.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle roof structure of a vehicle comprising:
   an outer roof panel; and
   a unitized inner roof panel separate from the outer roof panel and secured to the outer roof panel, the unitized inner roof panel comprising roof headers, a roof bow, and support braces, the roof headers spaced apart from each other and extending in a transverse direction relative to a longitudinal direction of the vehicle, the roof bow spaced apart from and positioned between two roof headers of the roof headers and extending in the transverse direction, and each support brace being positioned between the roof bow and one of the two roof headers,
   wherein each of the support braces comprises a continuous structure that extends from the roof bow to the one of the two roof headers, the support braces extend in multiple directions,
   wherein the outer roof panel includes sides that are folded over respective sides of the unitized inner roof panel to mechanically interlock the outer roof panel and the unitized inner roof panel.

2. The vehicle roof structure of claim 1, wherein the unitized inner roof panel has a thickness that is greater than a thickness of the outer roof panel.

3. The vehicle roof structure of claim 1, further comprising a pair of roof rails disposed at opposing sides of the outer roof panel, and wherein the outer roof panel is fixed to the pair of roof rails.

4. The vehicle roof structure of claim 1, further comprising reinforcement members secured to an upper surface of the unitized inner roof panel and positioned between the outer roof panel and the unitized inner roof panel.

5. The vehicle roof structure of claim 4, wherein at least one reinforcement member of the reinforcement members has a variable thickness.

6. The vehicle roof structure of claim 1, wherein the support braces are positioned above the roof headers and the roof bow.

7. The vehicle roof structure of claim 1, further comprising an adhesive material between the outer roof panel and the unitized inner roof panel and bonded to the outer roof panel and the unitized inner roof panel.

8. The vehicle roof structure of claim 1, wherein two support braces of the support braces form an X shape.

9. The vehicle roof structure of claim 1, wherein:
   the roof headers include a front roof header and a rear roof header; and
   the support braces include a first set of support braces positioned between the roof bow and the front roof header and a second set of support braces positioned between the roof bow and the rear roof header.

10. The vehicle roof structure of claim 9, wherein the first and second sets of the support braces are positioned above the front roof header, the rear roof header and the roof bow.

11. A vehicle roof structure of a vehicle comprising:
an outer roof panel; and
a unitized inner roof panel separate from the outer roof panel, the unitized inner roof panel comprising roof headers, a roof bow, and support braces, the roof headers including a front roof header and a rear roof header spaced apart from each other and extending in a transverse direction relative to a longitudinal direction of the vehicle, the roof bow spaced apart from and positioned between the front and rear roof headers and extending in the transverse direction, and the support braces positioned above the roof bow and the front and rear roof headers,
wherein the support braces include a first set of support braces positioned between the roof bow and the front roof header and a second set of support braces positioned between the roof bow and the rear roof header,
wherein the outer roof panel includes sides that are folded over respective sides of the unitized inner roof panel to mechanically interlocked the outer roof panel and the unitized inner roof panel.

12. The vehicle roof structure of claim 11, wherein the unitized inner roof panel has a thickness that is greater than a thickness of the outer roof panel.

13. The vehicle roof structure of claim 11, further comprising reinforcement members secured to an upper surface of the unitized inner roof panel and positioned between the outer roof panel and the unitized inner roof panel.

14. The vehicle roof structure of claim 13, wherein at least one reinforcement member of the reinforcement members has a variable thickness.

15. The vehicle roof structure of claim 11, wherein the support braces extend in multiple directions.

16. A vehicle comprising:
a pair of roof rails;
a roof structure disposed between the pair of roof rails, the roof structure comprising:
an outer roof panel fixed to an inboard side of the pair of roof rails; and
a unitized inner roof panel separate from the outer roof panel and mechanically interlocked to the outer roof panel, the unitized inner roof panel comprising roof headers, a roof bow, and support braces, the roof headers spaced apart from each other and extending in a transverse direction relative to a longitudinal direction of the vehicle, the roof bow spaced apart from and positioned between two roof headers of the roof headers and extending in the transverse direction, and the support braces positioned between the roof bow and one of the roof headers,
wherein each of the support braces comprises a continuous structure that extends from the roof bow to the one of the roof headers.

17. The vehicle of claim 16, further comprising a sensor structure mounted to the outer roof panel and supported by the support braces.

* * * * *